Feb. 7, 1939.  E. E. HENNING  2,145,982
MOTOR VEHICLE DOOR LOCK
Filed March 3, 1937  2 Sheets-Sheet 1
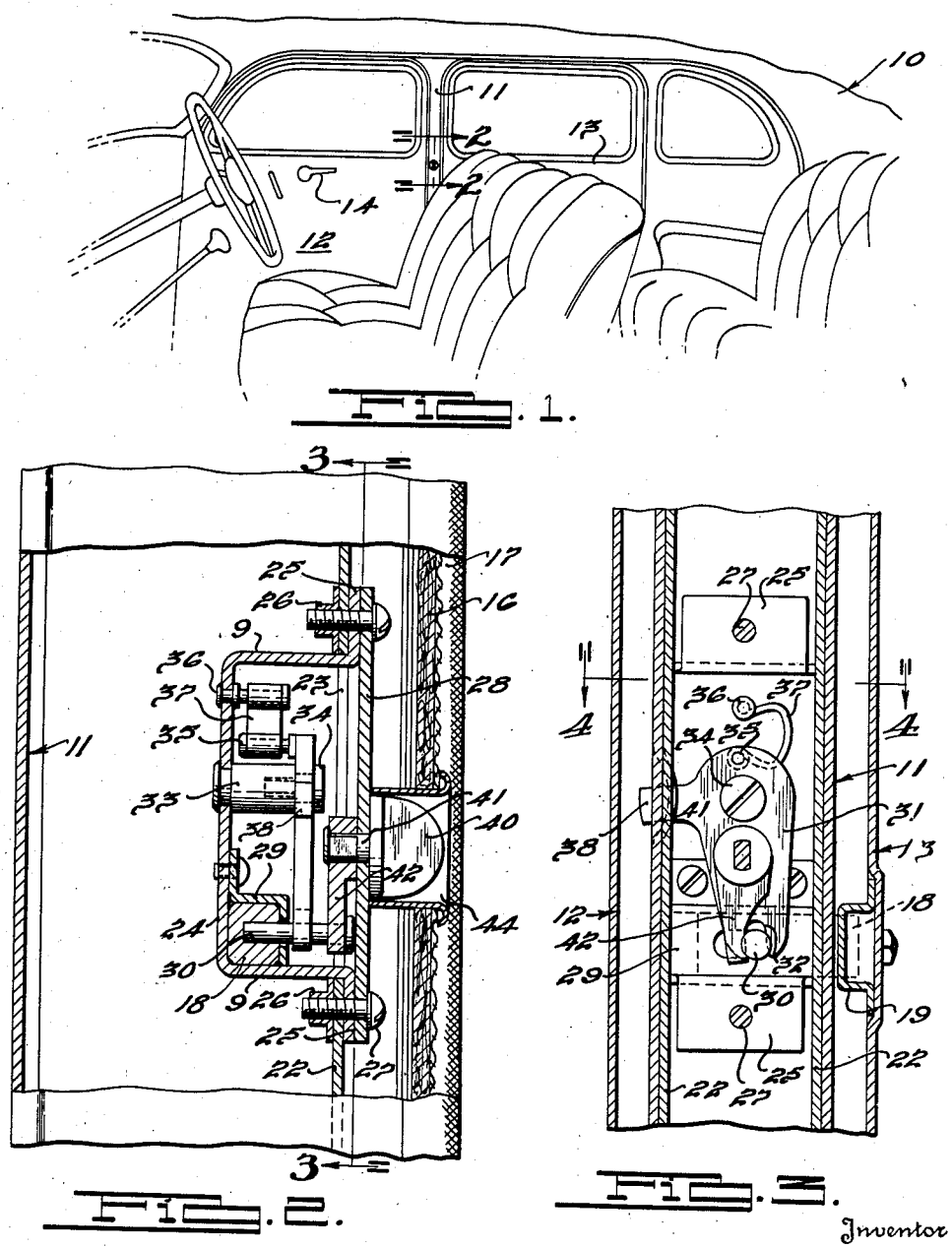
Inventor
Edward E. Henning.
By Tibbetts & Hart
Attorneys Feb. 7, 1939. E. E. HENNING 2,145,982
MOTOR VEHICLE DOOR LOCK
Filed March 3, 1937 2 Sheets-Sheet 2
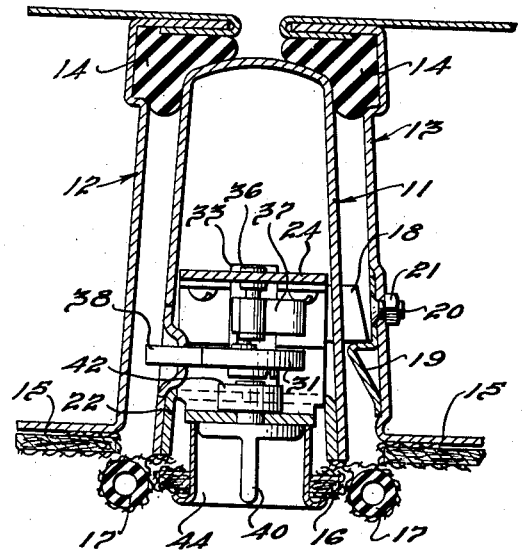
Inventor
Edward E. Henning.
By Tibbetts & Hart
Attorneys.

Patented Feb. 7, 1939

2,145,982

UNITED STATES PATENT OFFICE 2,145,982

MOTOR VEHICLE DOOR LOCK

Edward Ernest Henning, Detroit, Mich., assignor to Packard Motor Car Company, Detroit, Mich., a corporation of Michigan Application March 3, 1937, Serial No. 128,816

9 Claims. (Cl. 292—143)

This invention relates to locking mechanisms and more particularly to locking mechanisms for the rear doors of motor vehicle bodies.

It is customary to provide a latch mechanism for each door of a motor vehicle body, and with each of such mechanism is associated manually operable means that can be controlled by handles arranged one outside of and another inside of the body. It is also customary to provide some form of locking mechanism for each door, in some instances the latch mechanism is locked and in other instances mechanism separate from the latch mechanism is provided.

The forms of locking mechanism referred to are usually manually operable inside the body and they must be released before the doors can be opened. Under a majority of driving conditions, such locking mechanisms are entirely satisfactory but there are times when such mechanisms are unsafe. For example, children in the back of a body can unlock the locking mechanism for a door, in play or without knowledge of the consequences, and then by operating the latch mechanism can open a door and fall out or be pulled out by the outward swing of the unlatched door. Such condition is very undesirable when children are alone in the rear of a vehicle body having front and rear doors.

It is an object of the invention to provide door locking mechanism which cannot be unlocked except under conditions safe to the occupants of the vehicle body.

Another object of the invention is to provide locking mechanism for the rear door of a vehicle body which can be unlocked only while the adjacent front door is in open position.

Another object of the invention is to provide locking mechanism for the rear door of a vehicle body which can be shifted to locked position from an accessible point within the body but which can be unlocked only while a front door of the vehicle body is open.

A further object of the invention is to provide rear door locking mechanism for a vehicle body having actuator means that is rendered inaccessible for manipulation when the front door is closed.

These and other objects of the invention will appear from the following description taken in connection with the drawings, which form a part of this specification, and in which:

Fig. 1 is a fragmentary vertical elevation of the inside of a motor vehicle body having the invention associated therewith;

Fig. 2 is a sectional view of the rear door locking mechanism taken on line 2—2 of Fig. 1;

Fig. 3 is another sectional view of the locking mechanism in locking position taken on line 3—3 of Fig. 2;

Fig. 4 is another sectional view of the locking mechanism in locking position taken on line 4—4 of Fig. 3;

Fig. 5 is a view similar to Fig. 3 except that the locking mechanism is shown in unlocked position;

Fig. 6 is a sectional view similar to Fig. 3 of a modified form of the locking mechanism.

The invention is shown associated with a conventional sedan type of motor vehicle body, indicated generally by the numeral 10, having on each side thereof a center pillar 11 and laterally swingable doors 12 and 13. The front door 12 is hinged to the body at its front edge and the rear door 13 is hinged to the body at its rear edge, such doors being arranged to align longitudinally of the body with each other and with the center pillar when in closed position. Rubber stripping 14 is carried by the doors in a relation to engage the center pillar 11 for the purpose of sealing the doors with the body. Fixed on the inner panel of the doors is a conventional cloth covered panel 15, and on the inner panel of the center pillar is fixed a cloth covered panel 16 having windlasses 17 along the front and rear edges thereof arranged to be engaged by the panels 15 on the front and rear doors.

It is to be understood that each of the doors is equipped with a conventional form of latch mechanism arranged to inter-engage with means on the adjacent center pillar for releasably securing the doors in closed position, and that each of such mechanisms is controlled by a handle on the inside and outside of each door, one of the inside handles being indicated at 14 in Fig. 1.

As previously stated, it is customary to provide each door with a lock mechanism, manually operable from the interior of the body, that can be separate from the latch mechanism or can be formed as a part thereof. Such lock mechanisms, when operable from the interior of the body, are unsafe because children can unlock and open the rear doors and fall or be dragged out without the occupants of the front seat being aware of their activity. The present invention proposes to remove such insecurity by providing locking mechanism for the rear doors which cannot be unlocked while the front doors are closed, although if desired, they can be manipulated from the interior of the body into locking position when the front door is closed.

The locking mechanism is preferably mounted substantially within the center pillar and includes a shiftable locking member 18 that can be projected from the pillar to a position for engaging the striker plate 19, such plate being fixed on the front wall of the rear door by suitable means such as screws 20 and nuts 21.

The inner panel or wall 22 of the center pillar is formed with a slot 23 into which a carrier or supporting means for the locking mechanism is inserted. This supporting means consists of a metal bracket formed to provide a backing 24 extending vertically in the pillar, horizontally extending portions 9 and vertically extending ends 25. Threaded nut members 26 are fixed to the inner face of the panel 22 and bolts 27 extend through a cover plate 28 for the supporting bracket, the ends 25 of the bracket, the panel 22 and the nuts 26. In this manner the bracket and its cover plate are removably fixed to the panel 22.

As shown in Figs. 2 to 5 inclusive, the locking member 18 is in the form of a sliding bolt. Fixed to the bracket base 24 is a guide member 29 and such guide member is provided with a slot through which pin 30, fixed to the sliding bolt, projects. A swingable actuator member 31 has a slotted lower portion 32 for straddling pin 30. Fixed to the base 24 of the bracket is a stud 33 into which a pivot member 34 is screwed, the actuator 31 being pivotally mounted on this pivot member 34. Associated with and preferably formed as an integral part of the actuator is a handle member 38 which projects through a slotted front wall of the center pillar. This member 38 projects only a short distance beyond the front wall of the pillar sufficiently to be manually engaged and operated but not far enough to interfere with the opening and closing of the front door.

The actuator 31 and the locking member 18 provide manually operable locking mechanism with which is associated means, in the form of a spring 37, to resist initial manual shifting operation and thereafter to assist such movement. Pin 35 projects from the upper end of the actuator 31 and a similar pin 36 projects from the base 24 of the bracket, such pins being spaced above and substantially in line with the pivot 34 of the actuator. The spring 37 is preferably in the form of a U having its ends encircling pins 35 and 36. The spring being anchored to the fixed bracket exerts pressure against the actuator tending to resist swinging movement thereof to move the bolt out of door locking and unlocking positions, but assisting the manually exerted force in swinging the actuator as soon as the pin 35 is moved a small degree out of vertical alignment with the pin 36 and pivot 34. The spring thus serves to normally hold the locking member or bolt in either door locking or unlocking position and assists in moving of the same from one position to the other.

Downward pressure on the member 38 will swing the slotted end of the actuator toward the right, as viewed in Figs. 3 and 5, and will move the pin 30 therewith and thus slide the locking bolt 18 into locking relation with the striker plate 19, as shown in Fig. 4. As soon as the actuator has been swung a short distance to the right in its bolt locking motion, the lower end of the spring 37 will assist in further swinging of the actuator to assist the manual operation of sliding the bolt into locking position. When the member 38 is moved upwardly then the actuator will be swung to the left, as viewed in Fig. 5, and it will move the sliding bolt therewith out of engaging relation with the striker plate 19 on the rear door, and the spring 37 in this instance will assist the manual operation of the actuator after the actuator has been moved a limited extent. As the member 38 extends through the front wall of the center pillar it will be seen that while the front door is closed manipulation of the locking mechanism is impossible, and that the front door must be opened to slide the locking bolt into or out of position to lock the rear door.

In the form of the invention shown in Fig. 6 the bolt 18, instead of being a separate member and slidable as in Figs. 2 to 5 inclusive, is formed as an extension of the actuator 31 and swings therewith to be moved into and out of the slot in front of the center pillar. Such locking extension is curved and preferably lies on an arc struck from the pivot of the actuator.

With the described form of locking mechanism I propose to associate control means whereby the same can be moved into locking position from a point interior of the body if so desired. However, this control means can be operated only to move the locking mechanism into locking position and cannot be operated to shift the locking mechanism into door releasing position. Handle means in the form of a wing nut 40 is provided with a shaft 41 extending through the cover plate 28 of the bracket and fixed on the inner end of this shaft is a cam element 42 arranged to bear against the pin 30 as shown in Figs. 2 to 5 inclusive. In Fig. 6 there is a pin 43 on the actuator member against which this cam element 42 engages. A collar 44 surrounds the wing nut and extends through the cover board on the center pillar panel 16 so that access can be had to grasp and turn the wing nut from the interior of the vehicle body.

If the locking mechanism is in unlocked position then by turning the wing nut in a counterclockwise direction, as viewed in Fig. 5, the element 42 will cam pin 30 or 43 and move the locking bolt 18 into locking position with the striker plate on the rear door. Of course a reverse movement of this wing nut will have no effect upon the locking mechanism.

In the event the rear door is open with the locking mechanism set in locking position, closing of the rear door will cam the locking member 18 to unlocking position which will reset the actuator in unlocking position where it will be held by spring 37. Thus the locking mechanism will not be broken or disassociated under such condition and the rear door will remain unlocked until again set, so that one cannot lock himself out of the car when the rear door is the last to be closed.

The locking mechanism herein described consists of few parts, is simple, and foolproof. It cannot be unlocked while the front door is closed and is therefore foolproof so that occupants in the rear of a sedan type of vehicle body cannot open the rear doors and fall or be pulled out by the opening of the doors while the front doors are closed.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle body having on one side front and rear doors and a pillar intermediate the doors, locking mechanism comprising a locking member mounted in the pillar and movable into and out of locking engagement with the rear door, a manually operable actuator member pivotally mounted in the pillar and connected with the locking member, and spring means in the pillar associated with said actuator member above the pivotal mounting thereof to set the member in either locking or unlocking position, said spring resisting initial manual movement of said actuator to move the locking member out of locking or unlocking position and thereafter assisting such manual effort.

2. In a motor vehicle body having on one side front and rear hinged doors and a pillar intermediate the doors, the pillar having a slotted front and rear wall, locking mechanism for the rear door comprising a locking member shiftably mounted in the pillar and adapted to be projected through the slot in the rear pillar wall to engage the rear door, means for setting the locking member in locking or unlocking positions, and manually operable actuator means connected to shift said locking member, said actuator means having a handle portion projecting through the slot in the front pillar wall and adapted to be concealed by the front door when closed.

3. In a motor vehicle body having on one side front and rear hinged doors and a pillar intermediate the doors, locking mechanism for the rear door comprising a bolt movably mounted in the pillar for engaging the rear door, an actuator pivotally mounted in the pillar, said actuator having a portion accessible through the front wall of the pillar when the front door is open for manual actuation, means operatively connecting said actuator with said bolt, and means accessible through the inner wall of the pillar for operating the actuator to move the bolt into locking relation only.

4. Locking mechanism for a vehicle door comprising a pivotally mounted actuator member, bolt means connected to be operated by said actuator, handle means operable to swing said actuator in opposite directions and move the bolt means into or out of door locking position, another handle means associated with said actuator member operable to swing said bolt means into door locking position only, and means for setting said bolt means in locking and unlocking positions.

5. Locking mechanism for a vehicle door comprising a pivotally mounted actuator member, bolt means connected to be actuated by movement of said actuator, handle means operable to swing said actuator member to move the bolt means into locking or unlocking positions, and manually operable means for camming said actuator in a direction to move said bolt means into door locking position, and spring means for setting the bolt means in either locking or unlocking positions.

6. In a vehicle body having on one side front and rear doors and a pillar between the doors, rear door locking mechanism comprising a locking member shiftably mounted in the pillar for engaging and disengaging the rear door, mechanism connected to shift said locking member into door engaging or disengaging positions, said mechanism being accessible for manual operation when said front door is open, and manually operable means accessible from the inside of the body for shifting said mechanism to move said locking member into door engaging position.

7. In a motor vehicle, the combination with the body thereof having two doors and a door pillar between them, of a locking member for the rear door having spring means for retaining it in either its locking or unlocking position, a keeper on said rear door cooperating with said locking member to hold the door in locked position, said keeper acting to force the locking member from its locking to its unlocking position when said rear door is moved to closed position with the locking member in its locking position, and manually operable means for moving said locking member from locking to unlocking position and vice versa, said manually operable means being accessible only when the front door is open and being unaffected by the movement of said front door.

8. In a vehicle body having on one side front and rear doors and a pillar intermediate the doors, locking mechanism comprising a bolt slidably mounted in the pillar and movable into and out of engagement with the rear door, an actuator connected to shift said bolt, said actuator being pivoted in the pillar and extending through a wall of the pillar in a relation to be manually engaged for operation, and spring means associated with the actuator in a relation to retain the same in either locking or unlocking position.

9. In a vehicle body having on one side front and rear doors and a pillar intermediate the doors, locking mechanism comprising a member within the pillar having a locking extension adapted to be projected through the pillar to engage the rear door and a handle extension projecting through another wall of the pillar and manually engageable for operation, pivot means for mounting said member within the pillar, and spring means associated with said member for retaining the same in locked or unlocked position.

EDWARD ERNEST HENNING.